United States Patent

Palmaer

[11] 4,238,132
[45] Dec. 9, 1980

[54] CONNECTOR

[76] Inventor: Tore G. Palmaer, Kvarnliden 2, S-330 30 Gnosjö, Sweden

[21] Appl. No.: 947,027

[22] Filed: Sep. 29, 1978

[30] Foreign Application Priority Data

Oct. 18, 1977 [SE] Sweden .............................. 1117166

[51] Int. Cl.³ .......................................... F16L 33/22
[52] U.S. Cl. ..................................... 285/39; 285/245; 285/255; 285/259
[58] Field of Search ................. 285/255, 245, 40, 242, 285/259, 253, 39

[56] References Cited

U.S. PATENT DOCUMENTS

| 435,734 | 9/1890 | Decarie et al. | 285/245 |
| 1,064,154 | 6/1913 | Miller | 285/255 |
| 1,802,499 | 4/1931 | Chapman | 285/255 X |
| 2,248,576 | 7/1941 | McConnohie | 285/245 |
| 2,937,892 | 5/1960 | Prescott, Jr. | 285/245 |
| 3,127,672 | 4/1964 | Kretschmer | 285/40 X |
| 3,290,067 | 12/1966 | Buckle | 285/259 X |
| 3,741,238 | 6/1973 | Lacey | 285/255 X |

FOREIGN PATENT DOCUMENTS

| 259048 | 11/1963 | Australia | 285/255 |
| 2510218 | 11/1975 | Fed. Rep. of Germany | 285/255 |
| 584793 | 11/1924 | France | 285/245 |
| 11080 | of 1894 | United Kingdom | 285/245 |
| 211489 | 4/1968 | U.S.S.R. | 285/245 |

Primary Examiner—Thomas F. Callaghan

[57] ABSTRACT

A connector for connecting a pipe to a hose comprises a cylindrical protrusion on the pipe supporting an outwardly flared frusto-conical nipple. The hose is to be placed over the nipple and a sleeve is provided having a corresponding frusto-conical bore with internal threading to enable the sleeve to be tightened on the nipple. The cone angle of the bore is not the same as the cone angle of the nipple.

6 Claims, 3 Drawing Figures

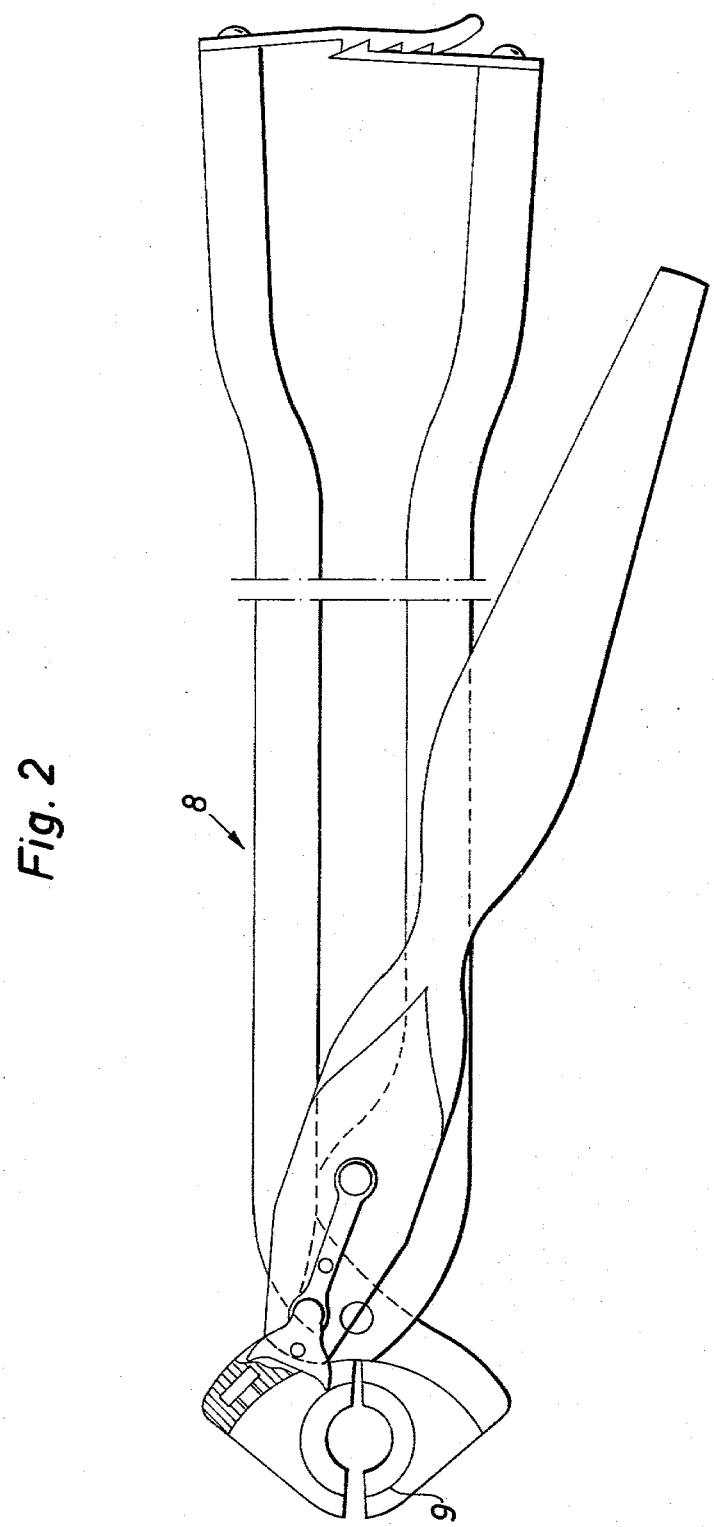

CONNECTOR

BACKGROUND OF THE INVENTION

The present invention relates to a connector, and more particularly to a connector specifically adapted to connect together a pipe and a hose.

Numerous different connectors have been proposed for connecting a pipe and a hose, such as a hose of resilient or flexible material. However, none of the prior proposed connectors can be considered to have all the features which are preferably in a connector of this type, some of such features being that the hose shall be easy to apply to the connector, and shall remain firmly in place on the connector without being damaged, and that no leakage shall occur, or, if a leakage does occur, the leakage shall occur in a way that the leakage can easily be eliminated, and that the connector can easily and economically be manufactured.

OBJECT OF THE INVENTION

The present invention seeks to provide a connector for connecting the hose to a pipe in which the above described disadvantages of prior proposed connectors are reduced or obviated.

SUMMARY OF THE INVENTION

According to this invention there is provided a connector for connecting a pipe and a hose comprising a nipple attached to or formed integrally with a pipe to which a hose is to be connected, and a clamping member, said nipple having a frusto-conical portion with a smooth outer surface, the base of the frusto-conical portion being located towards the free end of the nipple, and the smaller end of the frusto-conical portion being located towards the end of the pipe, said clamping member comprising a sleeve defining a frusto-conical bore and means defining a thread on the interior of the said bore to engage a hose located on the nipple, the cone angle of the bore being different from the cone angle of the nipple.

Preferably the cone angle of the nipple is less than the cone angle of the bore in the sleeve, and advantageously the sleeve may be formed from material which is harder than the material forming the nipple.

Conveniently the thread may be formed by a substantially helical rib formed on the interior surface of the bore, said rib having a substantially triangular cross section. The depth of the thread may preferably increase from the smaller diameter end of the bore to the larger diameter end of the bore.

Preferably said sleeve is provided, at each end of the frusto-conical bore, with respective cylindrical bores without threading.

Advantageously means such as protrusions or recesses are provided on the sleeve for cooperation with a tool used to tighten the sleeve. Such a tool may comprise a claw tong.

Advantageously the nipple may be joined to one end of the pipe by a cylindrical section which is of lesser diameter than the outer diameter of the pipe. This facilitates the formation of a bead when the end of the hose engages the end of the pipe.

Advantageously the smallest diameter of the bore in the sleeve is larger than the external diameter of the pipe, thus enabling the sleeve to slide freely over the pipe.

Whilst the sleeve is preferably formed of a single element, in an alternative embodiment of the invention the sleeve may consist of a plurality of segments which can be assembled and interconnected to form said sleeve, thus enabling the segments to be located in position around the hose which has been located on said nipple. In such a case it is preferred that the sleeve comprises two segments.

BRIEF DESCRIPTION OF THE DRAWINGS

In order that the invention may be more readily understood, and so that further features thereof may be appreciated, the invention will now be described by way of example with reference to the accompanying drawing in which:

FIG. 2 is a side view of a tool which may be utilised for tightening the connecting member of the connector.

DETAILED DESCRIPTION OF PREFERRED EMBODIMENT

Figure 1A:
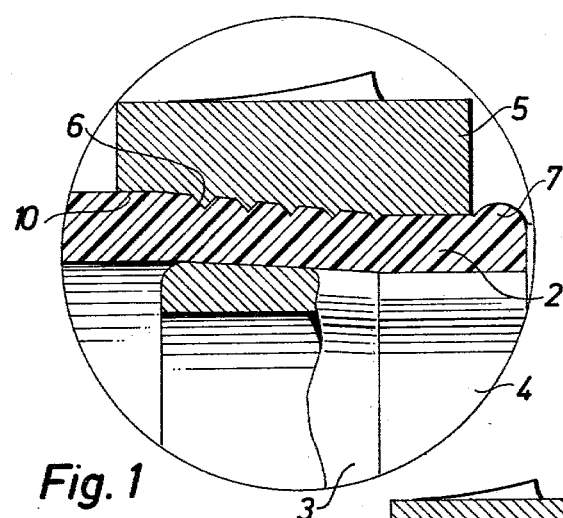
FIG. 1a is a view on a larger scale, of a portion of the connector illustrated in FIG. 1.
Figure 1:
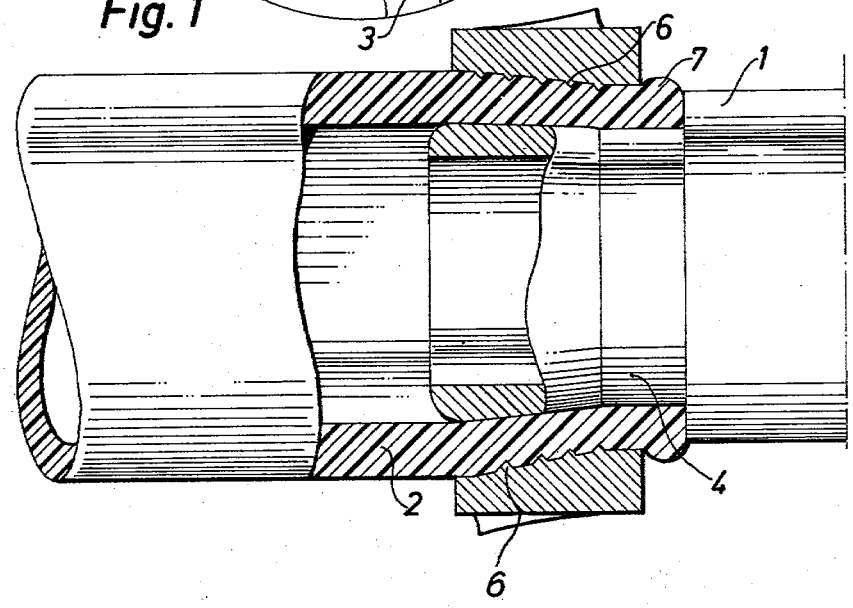
FIG. 1 is a part-sectional view of a connector in accordance with the invention, with a hose mounted in position on the nipple and secured by the clamping member.

Referring to FIG. 1 and FIG. 1a, a coupling for connecting together a pipe 1, and a hose 2, which may be a hose of resilient material, comprises a nipple connected to the pipe 1 and having a frusto-conical portion 3 with a smooth outer surface. The base of the frusto-conical portion 3 is located towards the free end of the nipple and, this embodiment actually forms the free end face of the nipple. The smaller end of the frusto-conical portion is located towards the end of the pipe 1 and is connected to the pipe 1 by a cylindrical section 4.

The connector also comprises a substantially cylindrical sleeve 5. The sleeve 5 has an axial bore, the bore comprising two respective terminal cylindrical portions and an intermediate frusto-conical portion. The cone angle of the frusto-conical portion of the bore is substantially equal to the cone angle of the frusto-conical portion 3 of the nipple, but preferably the cone angle of the nipple is less than the cone angle of the bore. A thread 6 is defined on the interior wall of the frusto-conical portion of the bore in the sleeve 5, the thread 6 being defined by a substantially helical rib which is of substantially triangular cross section. The height of the rib and thus the depth of the thread increases towards the portion of the frusto-conical bore of greatest diameter, as can be seen most clearly in FIG. 1a. The pipe 1 and the nipple may be formed of any suitable material, such as net-reinforced polyethylene, and preferably the sleeve 5 is formed of a material which is harder than the material forming the pipe. Furthermore the smallest diameter of the bore in the sleeve 5 is preferably greater than the largest external diameter of the pipe 1, thus enabling the sleeve to slide freely over the pipe 1.

In using a coupling as described above to connect a hose to the pipe 1 initially the hose 2 is fitted over the free end of the conical portion 3 of the nipple. The exterior surface of the frusto-conical part of the nipple 3 has a smooth surface so that the hose can slide over the nipple without difficulty. During this step the sleeve 5 is located to embrace a portion of the pipe 1. When the end of the hose 2 comes into contact with the end of the pipe 1 the sleeve 5 is pushed towards the nipple over the end of the hose. When the interior of the sleeve comes into contact with the hose the sleeve is rotated, and the screw thread thus engages the hose causing the sleeve to be driven forwardly, that is to say towards the free end of the nipple. The hose 2 is thus trapped between the nipple 3 and the sleeve 5, and the rotating action of the nipple causes the hose to be pushed further onto the nipple 3 causing a bead 7 to be formed against the end of the pipe 1. In using the connector in the manner described, it can easily be ascertained if the pipe and hose are correctly positioned within the coupling. Also, there is only one primary sealing surface and if a leak should occur, the origin of the leak can only be at this point, and consequently the leak can be remedied by tightening the sleeve further.

It will be appreciated that the thread 6 is so shaped that it can form its own complementary thread within the outer surface of the hose 2 and will follow this complementary thread so that the sleeve 5 cannot slide off the combination of the pipe and hose but moves along this combination to increase the sealing pressure between the hose and the nipple.

As mentioned above, it is preferred that the sleeve is made of a material which is harder than that of the pipe, but it is to be understood that this material should also be preferably harder than the material of the hose. Thus, the material forming the hose will be deformed into the spaces defined between adjacent turns of the ridge 6 forming the threading, and thus the hose has a relatively large contact surface with the conical surface of the sleeve, and with the conical surface of the nipple. The thread is shallower towards the free end of the hose 2 and the frusto-conical portion of the bore within the sleeve 5 terminates in respective cylindrical bore portions which do not have threading. The cylindrical portion of the bore of greatest diameter acts as a guide during the initial screwing of the sleeve 5 onto the combination of the pipe 2 and nipple 3. Also, when the sleeve 5 is in the position illustrated in FIG. 1a the cylindrical portion of the bore 10 of greatest diameter prevents distortion of the pipe 2 in the region of the free end of the nipple 3. When the sleeve 5 is in the position illustrated in FIG. 1a the portion of the frusto-conical bore provided with low threads firmly presses the pipe 2 against the frusto-conical portion 3 of the nipple to form a secure seal. It will be appreciated that the strength of the seal can be increased by further rotating the sleeve 5. The cylindrical portion of the bore within the sleeve 5 which is of least diameter clamps a part of the hose against the cylindrical portion 4 and against the narrower diameter portions of the frusto-conical portion 3. The effect of the pressure exerted by this narrow cylindrical portion is to remove the threads formed in the surface of the hose by the rib 6 so that a substantially even pressure is applied around the circumference of the pipe 2.

It has been found that the most noticeable deformation of the hose is located at a point which is within the sleeve, there being threads located on either side of this point. Thus the connector is able to withstand a high pressure within the hose.

It has also been found that a coupling constructed as described above, when used with modern pipe material, such as net-reinforced polyethylene, only requires a slight torsional force to ensure a complete seal. This means that a tool with small dimensions can be used to tighten the coupling, even if the coupling is located within a narrow installation slot. Preferably the outer surface of the sleeve is provided with protrusions or recesses (not shown) to engage with a tool such as a claw tong 8 which is illustrated, by way of example, in FIG. 2. This tool is of known design and comprises two pivoted arms having jaws 9 adapted to engage with items such as teeth formed on the exterior of the sleeve 5. The remaining features of the claw tong 8 are clear from the drawing.

It has been found that a coupling in accordance with the present invention is particularly suitable for use with pipes and hoses of a flexible material. The provision of a frusto-conical bore having a different cone angle from a frusto-conical nipple has been found to provide a very good seal.

It is to be noted that the invention is not limited to the specific embodiment described and shown above, since many modifications are feasible within the scope of the invention. For example, the nipple need not be arranged as an extension provided at the end of a pipe, but may extend from the side wall of a pipe as a "T" coupling, thus enabling a hose to be connected to a pipe intermediate the ends of the pipe. Also, the thread provided in the sleeve may be constituted by a rib having a different cross-sectional shape from that shown and, of course, the sleeve may be shaped externally in a variety of ways in order to facilitate tightening of a sleeve with various tools, or manually, depending upon the field of application. Thus the exterior of the sleeve may be knurled or may be hexagonal in shape to permit the sleeve to be rotated with a spanner. Also, the cone angle of the nipple and the sleeve bore may be different from those illustrated.

Whilst the invention has been described with reference to an embodiment in which the sleeve 5 is formed as an integral member it is to be appreciated that the sleeve 5 may be constituted by a plurality of segments which can be assembled and interconnected to form the sleeve. In such a case it is preferred that the sleeve consists of two segments which can be located to embrace the hose when the hose has been located in position on the nipple, the segments being interconnected and the sleeve 5 then being tightened in the manner described above.

What is claimed is:

1. A connector for connecting the ends of a pipe and a hose, comprising a tubular nipple having a smooth outer surface defining a cylindrical section and a contiguous frusto-conical section flaring outwardly therefrom, said cylindrical section being adapted to be inserted within and connected to the end of the pipe to which the hose is to be connected, said frusto-conical section being adapted to be inserted within the hose to which the pipe to be connected with the ends of said pipe and hose in abutment, a clamping member adapted to fit over the exterior surface of the pipe and hose in alignment with said nipple, said clamping member comprising a sleeve having a bore formed with cylindrical terminal sections, one terminal section being adapted to fit over said hose in juxtaposition with the cylindrical section of said nipple, said other terminal section section having a diameter greater than said first terminal section and being adapted to fit over the surface of said hose, and an intermediate frustro-conical section formed with a helical screw thread having a direction of closure moving from the pipe toward said hose, the conical angle of the frustro-conical section of the nipple being smaller than the conical angle of the bore, said thread increasing from the smaller diameter end of the bore to the larger diameter end of the bore to thereby act to push the material of the hose toward the small end deforming the same into an annular bead between the sleeve and the end of the pipe.

2. A connector according to claim 1 wherein the sleeve is formed from material which is harder than the material forming the nipple.

3. A connector according to claim 1 wherein said thread is formed by a substantially helical rib formed on the interior surface of the bore, said rib having a substantially triangular cross-section.

4. A connector according to claim 1 wherein said sleeve is provided with means for cooperating with a tool to tighten the sleeve.

5. A connector according to claim 1 wherein said cooperating means provide protrusions or recesses.

6. A connector according to claim 1 wherein the smallest diameter of the bore in the sleeve is larger than the external diameter of the pipe.

* * * * *